United States Patent [19]
Shakespear

[11] 3,785,672
[45] Jan. 15, 1974

[54] VEHICLE SUSPENSION SYSTEM
[75] Inventor: Horacio Shakespear, Orchard Lake, Mich.
[73] Assignee: General Motors Corporation, Detroit, Mich.
[22] Filed: June 19, 1972
[21] Appl. No.: 263,964

[52] U.S. Cl. .......................... 280/112 A, 280/124 R
[51] Int. Cl. ............................................. B60g 9/02
[58] Field of Search ............... 280/109, 110, 112 A, 280/112 R, 111, 113, 114, 115, 125, 126, 127, 128, 129, 130, 124 R

[56] References Cited
UNITED STATES PATENTS

| 2,885,217 | 5/1959 | Felburn | 280/124 R |
| 3,649,042 | 3/1972 | Allison | 280/112 A |
| 3,448,992 | 6/1969 | Wilfert et al. | 280/124 R |
| 3,589,200 | 6/1971 | Ruet et al. | 280/124 R |

Primary Examiner—Philip Goodman
Assistant Examiner—John A. Carroll
Attorney—W. E. Finken et al.

[57] ABSTRACT

A suspension system particularly adapted for the rear of automobile type vehicles and incorporating roll steer with independent ride rate and roll stiffness, the suspension system including a solid axle centrally connected to the body for pivotal movement about a longitudinal roll axis and a transverse deflection axis, a pair of longitudinal control arms disposed between the body and the axle to control the path of motion of the axle about either of the two axes, and a coil spring mounted on the body in the longitudinal plane of symmetry and connected to the axle at the center thereof through a bellcrank and connecting link, pivotal movement of the axle about the deflection axis corresponding to jounce deflection of the wheels being resisted by the spring and pivotal movement about the roll axis having no substantial effect on the spring so that the latter does not contribute to roll stiffness.

5 Claims, 4 Drawing Figures

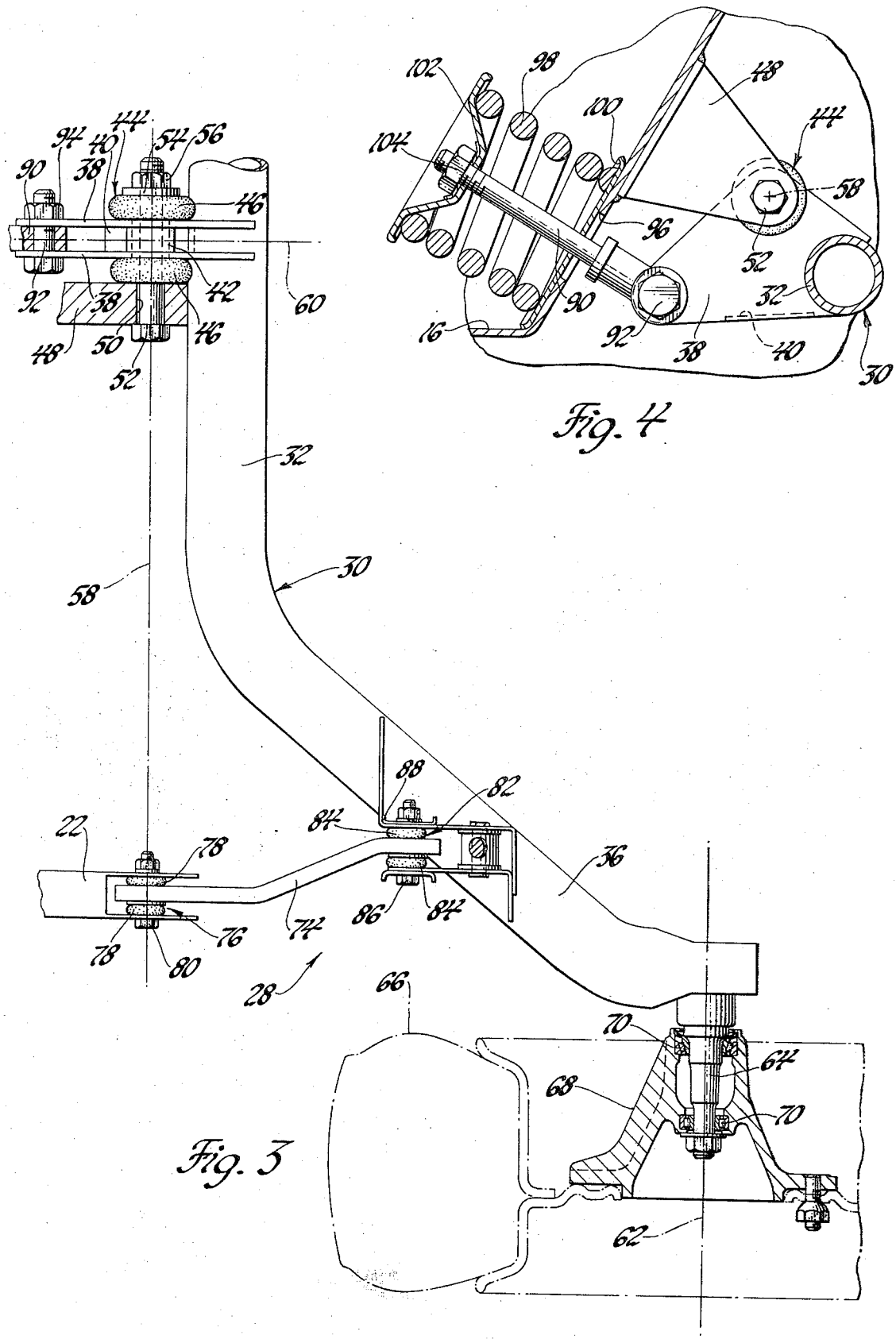

VEHICLE SUSPENSION SYSTEM

This invention relates generally to vehicle suspension systems and more particularly to an improved suspension system incorporating roll steer capability with independent or uncoupled ride rate and roll stiffness.

When designing suspension systems for automobile type vehicles engineers must consider the ride rate of the system, the roll stiffness of the system, and the effect of the system on the steering or handling characteristics of the vehicle. The ride rate, of course, refers to the resistance of the suspension system to equal inspringing or jounce deflection of the two road wheels at the front or the rear of the vehicle. Roll stiffness refers to the resistance of the suspension system to rolling or tilting of the body or sprung mass portion of the vehicle about a longitudinal roll axis as might occur due to centrifugal force during a turning maneuver. With respect to the handling characteristics of the vehicle, the suspension system, and particularly the rear suspension, might be designed to produce understeer, neutral steer, or oversteer in response to rolling of the body about the roll axis, this characteristic being referred to hereinafter as roll steer.

In many heretofore known suspension systems, roll steer capability exists in combination with interdependent ride rate and roll stiffness, i.e., the same springs provide both the ride rate and the roll stiffness as, for example, in a system incorporating laterally spaced springs disposed between the wheel supporting member and the sprung mass portion of the vehicle. In such systems a compromise must be made between optimum roll stiffness and optimum ride rate because optimum roll stiffness might dictate an intolerably "hard" ride while optimum ride rate might dictate an intolerably low resistance to body roll. Alternatively, some other heretofore known suspension systems are designed for independently variable ride rate and roll stiffness. A suspension system according to this invention represents an improvement over heretofore known systems in that it incorporates into a single, relatively simple structure, roll steer capability with roll stiffness independent of ride rate.

Accordingly, the primary feature of this invention is that it provides an improved vehicle suspension system particularly adapted to function as the rear suspension system for an automobile type vehicle. Another feature of this invention is that it provides an improved suspension system wherein roll stiffness is independent of ride rate and which includes roll steer capability. Yet another feature of this invention is that it provides an improved suspension system wherein the ride rate is variable in proportion to the amount of inspringing or jounce deflection of the wheels and which is capable of simple adjustment to vary the standing height of the body. Still further features of this invention reside in the provision in the suspension system of a solid axle centrally connected to the body for pivotal movement about a longitudinal roll axis and a transverse deflection axis, a pair of longitudinal control arms disposed between the body and the axle to control the path of motion of the axle about either of the two axes, and a coil spring mounted on the body in the longitudinal plane of symmetry and connected to the axle at the center thereof through a bellcrank and connecting link, pivotal movement of the axle about the deflecton axis corresponding to jounce deflection of the wheels being resisted by the spring and pivotal movement about the roll axis having no substantial effect on the spring so that the latter does not contribute to roll stiffness.

These and other features of this invention will be readily apparent from the following specification and from the drawings wherein:

FIG. 3 is a fragmentary partially broken away plan view of a portion of FIG. 1; and FIG. 4 is an enlarged sectional view taken generally along the plane indicated by lines 4—4 in FIG. 1.

Figure 1:
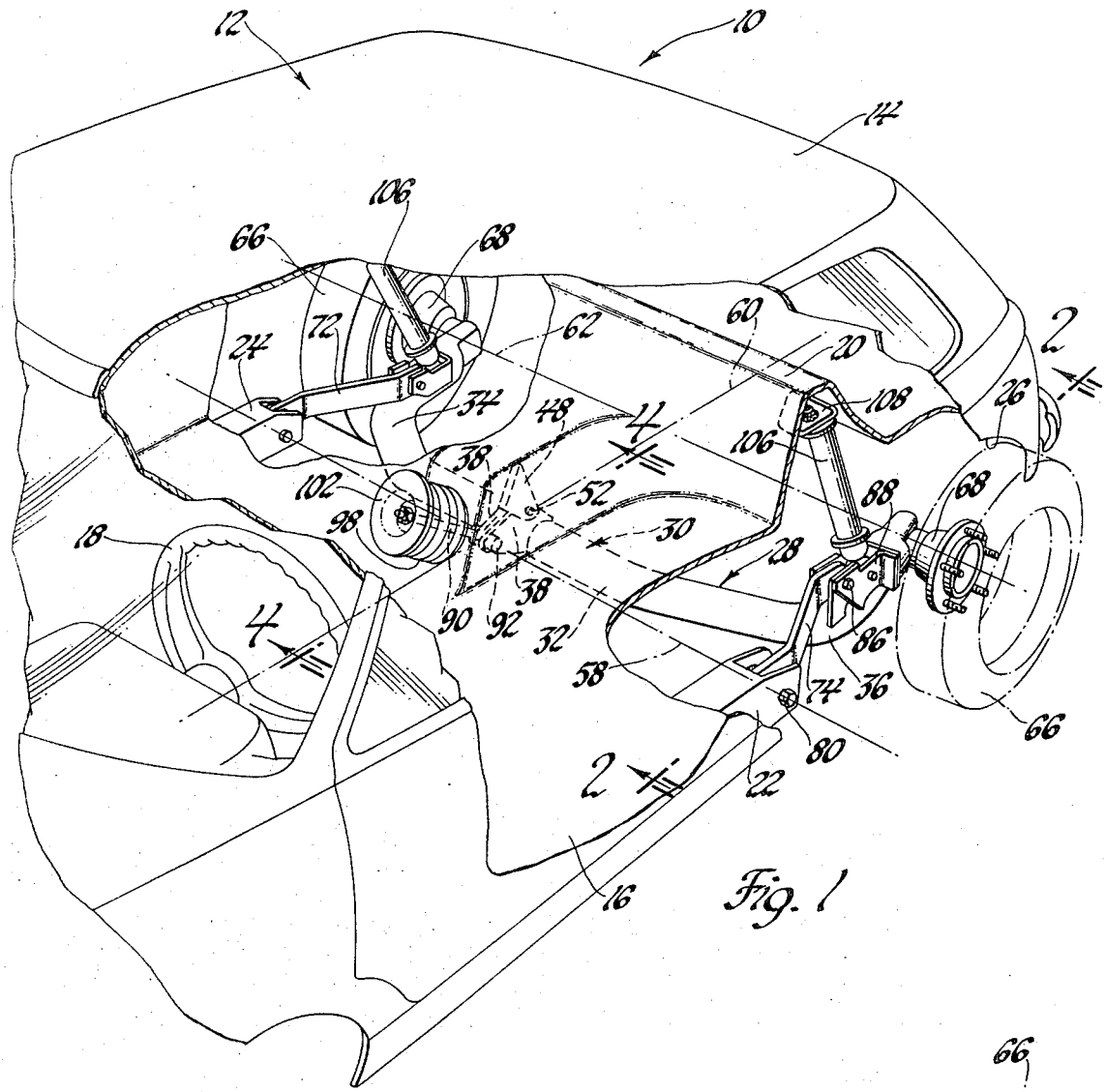
FIG. 1 is a fragmentary partially broken away perspective view of an automobile type vehicle having a suspension system according to this invention.

Referring now to FIG. 1 of the drawings, thereshown in perspective is an automobile type vehicle designated generally 10 having a body portion 12 including a passenger compartment defined at the top by a roof structure 14 and at the bottom by a floor structure 16. The floor structure extends generally horizontally from the firewall of the body forward of a steering wheel 18 toward the rear of the body and includes a kick-up or raised portion 20. A pair of laterally spaced longitudinally extending rails 22 and 24 are rigidly attached to the body portion below the floor structure and terminate forward of a pair of rear wheel housings defined by the body portion, only a segment 26 of the left rear wheel housing being shown in FIG. 1. Disposed generally laterally across the vehicle between the rear wheel housings is a suspension system according to this invention designated generally 28 which functions as the rear suspension system of the vehicle, the front suspension system not being shown since it would be of conventional configuration. It will be understood, however, that the suspension system according to this invention could be used as either front or rear suspension in combination with conventional rear or front suspension respectively.

Figure 2:
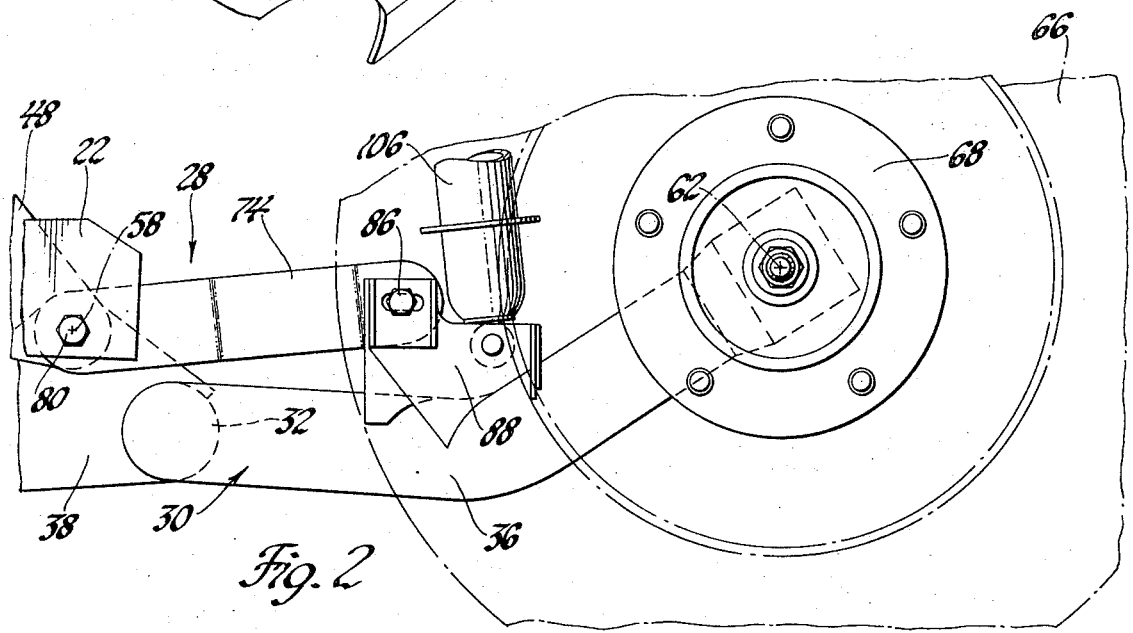
FIG. 2 is an enlarged view taken generally along the plane indicated by lines 2—2 in FIG. 1.

As best seen in FIGS. 2, 3 and 4, the rear suspension system 28 includes a generally U-shaped solid axle 30 having a straight central section 32 bounded on opposite ends by a pair of obliquely extending end sections 34 and 36. Generally at the center thereof, the solid axle has rigidly attached thereto, as by welding, a pair of spaced generally triangular bellcrank plates 38 interconnected by a web 40. Aligned circular apertures, not shown, in each of the plates adjacent the uppermost corners thereof, FIG. 4, are interconnected by a tube section 42 disposed between the plates, the apertures and the tube section defining a cylindrical tunnel between the plates. A rubber bushing 44 having a cylindrical bore extending therethrough is disposed within the tube section 42 and has a pair of enlarged end portions 46 situated outboard of respective ones of the plates 38.

As seen best in FIGS. 3 and 4, a support lug 48 rigidly attached to the floor structure 16 forward of the kick-up 20 extends rearwardly and has a cylindrical bore 50 extending therethrough. A bolt 52 is closely received within the bore 50 in the lug and is rotatably received within the bore in the bushing 44. The bushing is maintained on the bolt by a washer 54 and by a nut 56 threadedly received on the distal end of the bolt. Accordingly, the bolt 52 supports the solid axle on the body for pivotal movement about a deflection axis 58 of the vehicle defined by the bolt and extending in a horizontal plane transversely across the vehicle. The rubber bushing 44 is, of course, relatively compliant and permits limited universal movement of the axle including pivotal movement about a longitudinal roll axis 60 of the vehicle intersecting the deflection axis, the roll axis being situated in the longitudinal plane of symmetry of the vehicle at an angle relative to the ground depending upon the location of the roll center of the front suspension system, not shown.

As seen best in FIGS. 1 and 3, a pair of wheel spindles are rigidly attached to and project outwardly in coaxial relation from respective ones of the end sections 34 and 36 and define a wheel axis 62 extending parallel to and rearward of the deflection axis 58, only left spindle 64 being shown in FIG. 3. A pair of rear road wheels 66 are rotatably supported on the spindles in a conventional manner, as through a pair of hubs 68 and a plurality of wheel bearings 70, FIG. 3. The length of each of the end sections 34 and 36 is predetermined to position each of the wheels 66 in a corresponding one of the rear wheel housings of the body portion.

As seen best in FIGS. 1, 2 and 3, a pair of control arms 72 and 74 disposed, through identical mounting arrangements, between the rails 24 and 22 and the end sections 34 and 36 of the axle function to maintain the rear wheels in longitudinal alignment. Referring particularly to FIG. 3 wherein only control arm 74 is shown, the inboard or forward end of the arm includes an aperture in which is tightly received a rubber bushing 76 having enlarged ends 78. The bushing is rotatably supported on a bolt 80 carried by the rail 22 and aligned on deflection axis 58. Accordingly, the control arms are each pivotable about the deflection axis 58 and adapted by the bushings 76 for limited universal movement relative to the corresponding one of the rails.

Referring again to FIG. 3, the rearward or outboard end of the control arm 74 has an aperture therein which tightly receives another rubber bushing 82 having enlarged ends 84, the bushing 82 being rotatably mounted on a bolt 86 carried by a bracket assembly 88 rigidly attached to the end section 36 of the solid axle. The axle is, therefore, normally constrained in a manner whereby the wheel axis 62 revolves about the deflection axis in a circular orbit while being maintained parallel to the latter. Again, however, the bushings 82 permit limited universal movement of the control arms relative to the axle thereby to permit limited pivotal movement of the axle about the roll axis 60.

As seen best in FIGS. 1 and 4, one end of a connecting rod 90 is pivotally attached to the plates 38 through a bolt 92 disposed in aligned apertures in the plates and retained by a nut 94. The rod projects obliquely forward from the bolt 92 through an enlarged aperture 96 in a portion of the floor structure 16 overlying the central section 32 of the solid axle. A helical coil spring 98 is disposed about the portion of the rod 90 which projects beyond the floor structure 16 and seats at one end against a plate 100 on the floor structure and at the other end against a circular retaining plate 102. The plate 102 has a central aperture therein through which the distal end of the connecting rod 90 projects, the latter end threadedly receiving a nut 104 which functions to effect communication between the plate 102 and the rod 90. Accordingly, as seen best in FIG. 4, counterclockwise pivotal movement of the solid axle 30 about the deflection axis 58 corresponding to jounce deflection of the wheels effects compression of the spring 98 which thereby resiliently resists further pivotal movement. The rod 90 is disposed in and the spring 98 is disposed symmetrically with respect to the longitudinal plane of symmetry of the body portion 12 so that pivotal movement of the solid axle about the roll axis 60 within the limits defined by control arms 72 and 74 results in substantially no deflection of the spring.

Referring particularly now to FIGS. 2 and 4, the static weight of the vehicle urges the solid axle 30 into counterclockwise rotation, FIG. 2, about the deflection axis 58 with corresponding counterclockwise rotation of the bellcrank plates 38. The spring 98 is thus placed in compression between the floor structure 16 and the retaining plate 102 by the rod 90 with pivotal movement of the solid axle continuing until the resisting force generated on the plate 102 by the spring produces a turning moment on the plates 38 about the deflection axis equal to the turning moment generated thereon by the static weight of the vehicle at which instant the standing height of the vehicle is established. Should upward or downward adjustment of the standing height be desired, it is necessary only to respectively thread the nut 104 further in on the rod 90 or further out on the rod.

Describing now the dynamic operation of the suspension system 28, such operation can be divided into two distinct modes which might occur either separately or simultaneously. For simplicity, however, each mode will be treated as occurring separately. The first mode, of course, occurs when each wheel 66 experiences equal inspringing or jounce deflection relative to the body portion. In this situation the solid axle and the bellcrank plates pivot counterclockwise, FIG. 2, about only the deflection axis 58. Rotation of the bellcrank plates is, of course, resiliently resisted by the spring 98 which thus functions as the primary suspension spring for the entire rear suspension system. To damp the oscillations of the spring a pair of conventional shock absorber units 106 are disposed between the bracket assemblies 88 on the solid axle and a corresponding pair of mounts rigidly attached to the floor structure 16 at the kick-up, only left mount 108 being shown in FIG. 1.

Referring to FIG. 4, as the axle pivots about the deflection axis 58, the bolt 92 between the rod 90 and the bell-crank plates 38 traverses a circular arc which effects variation in the effective lever arm about the deflection axis through which the tensile force in the rod acts. This variation causes a concurrent variation in wheel rate or ride rate experienced by the rear wheels 66 which variation can be made to vary in proportion to the amount of wheel deflection. By properly locating the bolt 92 with respect to the deflection axis for any given vehicle it is possible to utilize this variable ride rate characteristic to more closely approach an optimum condition wherein passenger comfort is maximized.

The second dynamic mode of suspension system operation occurs when one of the rear wheels 66 experiences jounce deflection or inspringing and the other experiences rebound deflection thus causing pivotal movement of the solid axle about the roll axis 60. This condition exists, for example, when centrifugal force acting at the center of gravity of the vehicle during turning maneuvers causes the body portion 12 to tilt about the roll axis relative to the rear suspension system. The bushings 76 and 82 between the control arms and, respectively, the axle and the rails are, for purposes of discussion, initially assumed to be resilient enough to offer little or no resistance to universal movement of the control arms. Therefore, since the spring 98 in the longitudinal plane of symmetry of the vehicle experiences no significant deflection as a result of relative pivotal movement of the axle about the roll axis, the entire suspension system 28 offers virtually no resistance to roll, i.e., has a roll stiffness approaching zero.

It will, of course, be apparent to those skilled in the art that the resistance to universal movement of the control arms can be increased by increasing the stiffness of the bushings 76 and 82. Accordingly, the roll stiffness of the rear suspension system can be increased from zero to virtually any greater magnitude through proper selection of bushing resilience and design. The bushings, however, are not resiliently flexed by pivotal movement of the axle about the deflection axis, as during equal inspringing of the rear wheels, so that regardless of stiffness of the bushings, the ride rate of the suspension system is unchanged and is, therefore, completely uncoupled from or independent of the roll stiffness.

The uncoupled ride rate and roll stiffness of the suspension system is a desirable characteristic because it enables the designer to consider each independently of the other. For example, in a particular vehicle, the weight, engine location, and the like might dictate that the roll stiffness of the front suspension substantially exceed that of the rear while optimum riding comfort might require a stronger rear suspension. The suspension system according to this invention facilitates any such variation because the ride rate is dependent only on the spring 98 while the roll stiffness is a function only of the bushing resilience. Accordingly, the suspension system 28 provides great flexibility for the designer with respect to independently tailoring the ride and roll characteristics of the system.

As noted hereinbefore, the characteristic of automobile rear suspension systems known as roll steer has long been known to vehicle designers who use roll steer to improve the handling characteristics of the vehicle. Basically, roll steer is the tendency of the rear wheels to turn about a vertical axis in response to pivotal movement of the body portion about the roll axis during a turning maneuver. By properly proportioning the suspension system components, the rear wheels can be made to experience no turning movement about the vertical axis (neutral roll steer), turning movement about the vertical axis in the same direction as the steerable front wheels (roll understeer), or turning movement about the vertical axis in a direction opposite to the direction of movement of the steerable front wheels (roll oversteer).

In the suspension system 28 accordingly to this invention roll steer is a function of the initial orientation of the control arms 72 and 74. More particularly, referring to FIGS. 2 and 3 and assuming that at vehicle standing height each of the control arms is oriented horizontally, rolling of the body portion about the roll axis 60 effects equal pivotal movement of each control arm but in opposite directions. Since each control arm was initially horizontal, the change in the horizontal distance between the bolts 86 on the axle and the deflecton axis 58 is equal so that the wheel axis 62 remains parallel to the deflection axis, this condition being neutral roll steer. If, however, at vehicle standing height conditions the control arms are each disposed in a common plane defining angle above or below horizontal, then pivotal movement of the axle about the roll axis causing equiangular pivotal movement of the control arms in opposite directions will effect rearward movement of one of the bolts 86 and forward movement of the other relative to the deflection axis 58. Under these circumstances, of course, one of the end sections of the solid axle will be pulled forward and the other pushed rearward relative to the deflection axis thus pivoting the wheel axis clockwise or counterclockwise, FIG. 3. Accordingly, since the rear wheels 66 always remain perpendicular to the wheel axis, each wheel will be turned about a vertical axis to effect the desired understeer or oversteer.

Having thus described the invention, what is claimed is:

1. In a vehicle body suspension system including a solid axle, a pair of wheels rotatably disposed on opposite ends of said axle, means connecting said axle at the center thereof to said body at the longitudinal plane of symmetry of the latter for limited universal movement including pivotal movement about a transverse deflection axis of said body and a longitudinal roll axis of said body intersecting said deflection axis, and axle control means disposed between said body and said axle on opposite sides of said connecting means for effecting control of the path of motion of said axle, the improvement comprising, spring means mounted on said vehicle body for compression and expansion deflection, and connecting means disposed in the longitudinal plane of symmetry of said body between said spring means and said axle for effecting compression deflection of said spring means in response to pivotal movement of said axle about said deflection axis corresponding to jounce deflection of said wheels thereby to provide suspension system ride rate while effecting substantially no deflection of said spring means in response to pivotal movement of said axle about said roll axis so that the roll stiffness of said suspension system is substantially completely independent of the ride rate of said system.

2. In a vehicle body suspension system including a solid axle, a pair of wheels rotatably disposed on opposite ends of said axle, means connecting said axle at the center thereof to said body at the longitudinal plane of symmetry of the latter for limited universal movement including pivotal movement about a transverse deflection axis of said body and a longitudinal roll axis of said body intersecting said deflection axis, and axle control means disposed between said body and said axle on opposite sides of said connecting means for controlling the path of motion of said axle about said deflection axis and for effecting roll steer, the improvement comprising, means defining a spring seat on said vehicle body situated symmetrically with respect to the longitudinal plane of symmetry of said body, a coil spring seated at one end on said spring seat, and connecting link means disposed in the longitudinal plane of symmetry of said body between the free end of said coil spring and said axle for effecting compression deflection of said coil spring in response to pivotal movement of said axle about said deflection axis corresponding to jounce deflection of said wheels thereby to provide suspension system ride rate while effecting substantially no deflection of said coil spring in response to pivotal movement of said axle about said roll axis so that the roll stiffness of said suspension system is substantially completely independent of the ride rate of said system.

3. The improvement as recited in claim 2 further including adjustment means associated with said connecting link means and actuable to change the length of said connecting link means for adjusting the standing height of said body.

4. In a vehicle body suspension system including a solid axle, a pair of wheels rotatably disposed on opposite ends of said axle, means connecting said axle at the center thereof to said body at the longitudinal plane of symmetry of the latter for limited universal movement including pivotal movement about a transverse deflection axis of said body and a longitudinal roll axis of said body intersecting said deflection axis, and axle control means disposed between said body and said axle on opposite sides of said connecting means for controlling the path of motion of said axle about said deflection axis and for effecting roll steer, the improvement comprising, means defining a spring seat on said body situated symmetrically with respect to the longitudinal plane of symmetry of said body, a coil spring seated at one end on said spring seat, a connecting rod disposed within said coil spring in the longitudinal plane of symmetry of said body, means connecting the free end of said coil spring to one end of said connecting rod so that bodily shiftable movement of said rod effects compression deflection of said spring, means defining a rigid bellcrank on said axle situated in the longitudinal plane of symmetry of said body and pivotable as a unit with said axle about said deflection axis, and means pivotally connecting the other end of said connecting rod to said bellcrank at a location on the latter spaced from said deflection axis so that pivotal movement of said axle about said deflection axis corresponding to jounce deflection of said wheels effects bodily shiftable movement of said connecting rod against a resisting force generated by said spring and directed longitudinally of said rod, said resisting force developing a variable turning moment on said bellcrank and said axle about said deflection axis proportional to the amount of pivotal movement of said axle about said deflection axis thereby to provide shiftable movement of said connecting rod against a resisting force generated by said spring and directed longitudinally along said rod, said resisting force through said bellcrank developing a variable turning moment on said axle about said deflection axis proportional to the amount of pivotal movement of said axle thereby to provide variable suspension system ride rate while pivotal movement of said axle about said roll axis effects substantially no bodily shiftable movement of said connecting rod so that the roll stiffness of said suspension system is substantially completely independent of the ride rate of said system.

5. A vehicle body suspension system having roll steer capability wherein the suspension system roll stiffness is independent of the system ride rate comprising, in combination, a solid axle having a generally U-shaped configuration and defining a wheel axis, a pair of wheels supported on said axle at opposite ends thereof for rotation about said wheel axis, means connecting the center of said solid axle to said body at the longitudinal plane of symmetry of the latter for limited universal movement including pivotal movement about a transverse deflection axis of said body forward on said body of said wheel axis and a longitudinal roll axis of said body disposed in the longitudinal plane of symmetry of said body and intersecting said deflection axis, a pair of control arms supported on said vehicle body symmetrically with respect to the longitudinal plane of symmetry of the latter for limited universal movement including pivotal movement about said deflection axis, means connecting each of said control arms to said axle for limited universal movement relative to the latter, said control arms controlling the path of motion of said axle about said deflection axis and providing roll steer, means defining a spring seat on said body situated symmetrically with respect to the longitudinal plane of symmetry of said body, a coil spring seated at one end on said spring seat, a connecting rod disposed within said coil spring and in the longitudinal plane of symmetry of said body, means connecting the free end of said coil spring to one end of said connecting rod so that bodily shiftable movement of said rod effects compression deflection of said spring, means defining a rigid bellcrank on said axle disposed in the longitudinal plane of symmetry of said body and pivotable as a unit with said axle about said deflection axis, and means pivotally connecting the other end of said connecting rod to said bellcrank at a location on the latter spaced from said deflection axis so that pivotal movement of said axle about said deflection axis corresponding to jounce deflection of said wheels effects bodily shiftable movement of said connecting rod against a resisting force generated by said spring and directed longitudinally of said rod, said resisting force through said bellcrank developing a variable turning moment on said axle about said deflection axis proportional to the amount of pivotal movement of said axle about said deflection axis thereby to provide a variable suspension system ride rate while pivotal movement of said axle about said roll axis effects substantially no bodily shiftable movement of said connecting rod so that the roll stiffness of said suspension system is substantially completely independent of the ride rate of said system.

* * * * *